Figure 4:
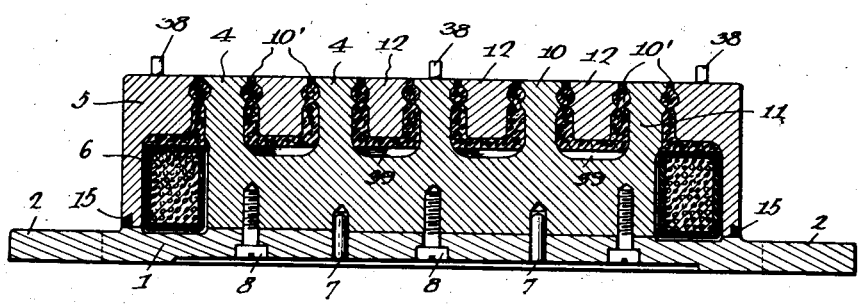

R. C. PATTON.
MAGNETIC CHUCK.
APPLICATION FILED APR. 25, 1912.
1,081,462.
Patented Dec. 16, 1913.
2 SHEETS—SHEET 1.
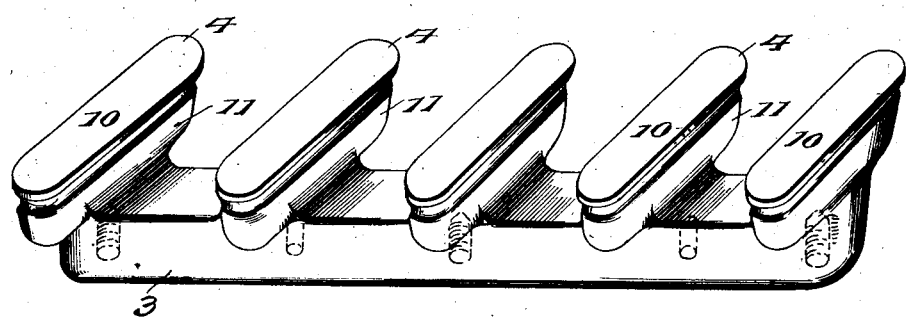
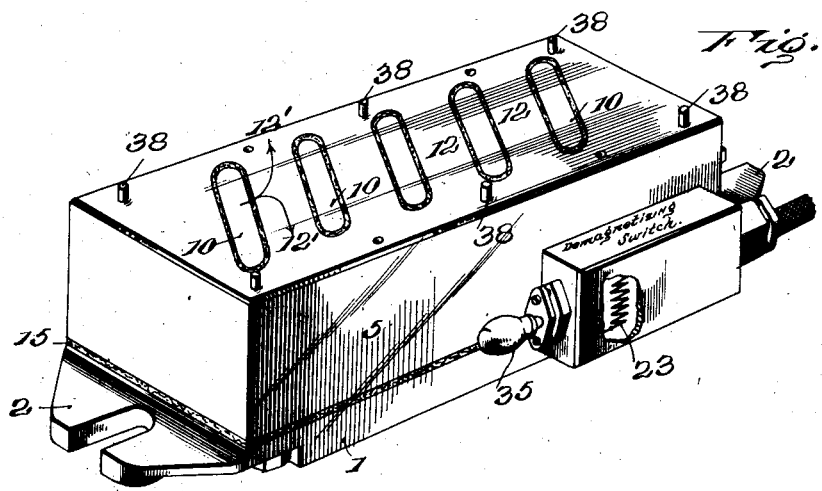
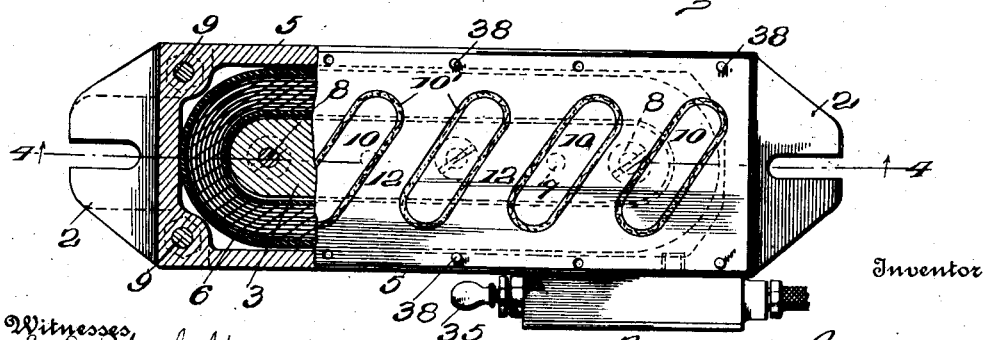
Witnesses
O. E. Warfield
Jas. H. Anderson
Inventor
Ralph C. Patton.
By Mauro, Cameron, Lewis & Massie
Attorneys

R. C. PATTON.
MAGNETIC CHUCK.
APPLICATION FILED APR. 25, 1912.

1,081,462.

Patented Dec. 16, 1913.
2 SHEETS—SHEET 2.

Witnesses:
E. E. Warfield
Jan. H. Anderson

Inventor:
Ralph C. Patton
by
Mauro, Cameron, Lewis & Massie
attys.

UNITED STATES PATENT OFFICE.

RALPH C. PATTON, OF PROVIDENCE, RHODE ISLAND, ASSIGNOR TO D & W FUSE COMPANY, OF PROVIDENCE, RHODE ISLAND, A CORPORATION OF RHODE ISLAND.

MAGNETIC CHUCK.

1,081,462. Specification of Letters Patent. Patented Dec. 16, 1913.

Application filed April 25, 1912. Serial No. 693,252.

*To all whom it may concern:*

Be it known that I, RALPH C. PATTON, of Providence, Rhode Island, have invented new and useful Improvements in Magnetic Chucks, which invention is fully set forth in the following specification.

This invention relates to improvements in magnetic chucks, a class of devices designed for holding articles of magnetic material while undergoing machining operations, and has for its object to provide a device of the kind referred to which possesses a marked increased holding power for a given expenditure of energy; which prevents drag or movement of the piece of work either lengthwise or across the surface while undergoing machining operations and which has a low magnetic leakage.

A further object of the invention is to provide a water-tight joint peculiarly adapted for use in a magnetic-chuck casing and which is simple, efficient and can be quickly made without special tools. This improvement as herein described, but not claimed, forms the subject-matter of my copending application Serial No. 708,878, filed July 11, 1912, wherein the same is claimed.

It has heretofore been proposed to construct magnetic chucks with a single core and to provide the same with a plurality of oblong polar projections the ends of which lie in the face of the chuck with their longer axes parallel to one edge of the rectangular chuck casing. The directions in which machining movements usually occur with these forms of chuck are normal to the edges of the chuck face. When the movement is normal to the edge of the chuck and perpendicular to the elongated axes of the pole faces the sidewise drag on the work is resisted whereas when the machining movement is parallel to the edge of the chuck and with the long axes of the pole faces, then there is less resistance to the drag on the work. This difference in holding power of the chuck in the two directions of movement of the machining operations detracts from the usefulness of chucks of this class, particularly when holding small pieces. My invention overcomes this objection by providing the core of the energizing magnet with one or more pole extensions or pieces set at an angle other than 90° to one edge of the rectangular chuck face and also at an angle other than 90° to the longer dimension of the body of the magnet core. By reason of this construction, the magnetic material, when small, placed on the face of the chuck is held against dragging action by the movement of the tools in both lateral and lengthwise directions on the face of the chuck, since the lines of magnetic force would be disrupted in any effort to move the piece in these two working directions. These two directions are the only directions in common practice in which there would be occasion to operate the tools over the chuck face. Other important advantages flow from this construction such as increased holding power for a given expenditure of energy, the reduction of magnetic leakage and other advantages as will appear in the detailed description.

In using magnetic chucks, it is frequently necessary to flood the chuck with water particularly during the process of grinding. Difficulty has arisen in making a water-tight joint between the casing walls and the bottom plate of the chuck without interposing resistance to the flow of magnetic lines at that point such as results by the use of a gasket which necessitates a magnetic gap at the joint. I have devised a calking joint which does not interfere to any appreciable extent with the flow of magnetic lines across the joint while securing the necessary degree of tightness to exclude water. While the details of construction of my calking joint may be varied the essential feature of construction resides in providing a reëntering groove in the edge of the wall where the joint occurs adapted to receive and retain calking material such as hemp, twine or the like, which is rendered impervious to water by water-proofing material such as paint, pitch, shellac, varnish or similar materials. Either member of the joint may be provided with the retaining groove or both members may be so provided. The shape of the groove may take on various forms either curvilinear or angular provided that a reëntering space is formed capable of acting to retain packing. This joint avoids the use of gaskets while securing a water-tight joint and has the advantage of interfering with the flow of magnetic lines across the junction of the parts to a minimum degree.

In order that the invention may be clearly understood and readily carried into effect, I will describe the same with reference to the constructional form embodying the invention represented by way of example in the accompanying drawings, in which:—

Figure 5:
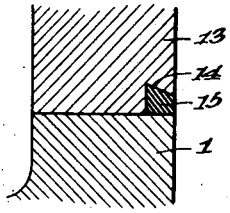

Figure 1 is a perspective view of a magnetic chuck embodying my improvements. Fig. 2 is a plan view partly in section showing the angular arrangement of the pole faces and the interior construction. Fig. 3, is a perspective view of the magnet core with its pole projections. Fig. 4 is a vertical longitudinal section on the line 4—4 of Fig. 2. Fig. 5 is an enlarged detail showing my improved packing joint.

Referring to the drawings, the magnetic chuck comprises a base plate 1 having means such as slotted projections 2 for securing it to the bed plate of a planing or like machine; a magnet core 3 having elongated pole projections 4 which are arranged at an angle other than 90° to the longer axis of the core and are preferably integral therewith; a casing 5 adapted to be secured to the base plate and provided in its top face with elongated openings for receiving the ends of the pole projections which are separated from the casing by gaps 10' filled with non-magnetic material and an energizing coil 6 which is preferably of the type which is wound with Deltabeston wire and can be readily replaced in case of accident to the coil. The core 3 may be secured to the plate 1 by any suitable securing means, such as by dowel pins 7 and screws 8. The casing, as illustrated, is secured to the base plate by corner bolts 9. The pole projections 4 are arranged and designed with a view of securing a plurality of polar areas 10 in the holding face of the chuck while securing a large cross-section for each projection whereby the magnetic reluctance through the projections may be minimized and further with a view of reducing the length of the path through the core and thereby reducing resistance to the magnetic lines. These results are accomplished in large measures by providing the core with projections which are elongated transversely of the long axis of the core instead of parallel with this axis as has heretofore been proposed. The neck 11 of each projection can thus be made as thick or even thicker than the thickness of the core while enabling many more projections to be formed on a single core than in the parallel arrangement referred to. The reluctance to the flow of the magnetic lines through that part of the magnetic circuit including the pole extensions is thereby materially reduced with a corresponding increase in the holding power of the chuck. Again this construction which permits increased spacing of the pole projections 4, 4, and also deepening of the spaces between these projections enables the portions 12 of the cover which are located between the pole projections 4, 4, and constitute parts of the magnetic circuit to be materially enlarged in cross-section without reducing the cross-section of the necks 11 of the pole projections 4, thereby further reducing the reluctance of the circuit while securing the advantages of short divided paths for the lines to flow between the pole areas 10 and the sides of the chuck through portions 12. This is made plain by reference to Fig. 1. The magnetic lines which may be assumed to flow from pole areas 10 pass into sections 12 and therein find two paths indicated by the arrows 12' through which to return to the casing. Thus my arrangement of the pole projections enables reduction in the resistance to the flux and also shortens the path. Again the height of the chuck has been enabled to be shortened about 17% by the fact of deepening the spaces between the pole extensions whereby the energizing coil may be raised on the necks of the projections with a gain in the reduction of leakage across the space between the core and body of the chuck at 39, a gain in the reduction of material in the construction and a marked gain in holding power of the chuck.

Magnetic chucks designed to be clamped or held fast to a bed plate are almost universally used in operations of grinding or planing either lengthwise or crosswise of their faces. In order to resist the drag on the work during these operations, I have discovered that the polar projections should also be angularly disposed to the edges of the chuck case. By reason of this angular disposition of the pole faces with the edges of the chuck in holding small pieces the lines of force which hold the work to the chuck must be disrupted before any effort to move the piece laterally or longitudinally can result in dragging the work under the action of the tools. The holding properties of the face are thus extended in two directions, lengthwise and across the face instead of in one direction as in the parallel arrangement above refererd to. While the elongated pole projections 4 may be given any desired angular relation with the long axis of the core and the edge of the chuck between 0 and 90°, I have found that in a chuck with five pole projections an angle of about 30° with the normal to the long axis of the chuck or core gives good results. I, however, give this merely as an example and do not desire to be limited to such specific angular relation.

Another feature of my invention resides in an improved calking joint particularly adapted for rendering the joints of a magnetic chuck water-tight. Fig. 5 is an enlarged detail view showing the joint in cross-section in which 13 is the wall of the casing provided on its outer edge with a dove-tail groove 14 which follows around the bottom of the casing. The third side of the packing joint is formed by the surface of the base plate 1. Into this holding space is packed calking material 15 such as twine or the like saturated with waterproofing material such as shellac or some air drying varnish. It will be noted that this calking joint occupies but a small portion of the junction between the two magnetic surfaces across which the magnetic flux flows and therefore interferes but little with the magnetic circuit at this point while securing all the requisites of a water-tight joint without the use of a gasket which seriously interferes with the flux across the junction and with the holding power of the chuck. The packing can be readily removed for the purpose of gaining access to the interior of the casing and can be easily replaced without the use of any special tools.

In Figs. 1 and 2, I have shown a reversing switch attached to the chuck and have indicated the resistance coil 23 as inside the switch box for the sake of compactness though the switch and coil may be associated separately. The face of the chuck is shown provided with work holding pins 38 though side rests of any well known type may be substituted as they form no part of the present invention.

What is claimed is:—

1. In a magnetic chuck, the combination of a magnetizing coil and a core for the same, one end of which is provided with a plurality of pole projections the faces of which are arranged parallel with each other and transversely of and at acute angles with the longest dimension of said core.

2. In a magnetic chuck, the combination of a magnetizing coil and a core for the same, one end of which is provided with a plurality of pole projections the faces of which are elongated and arranged parallel with each other and transversely of and at acute angles with the longest dimension of said core.

3. In a magnetic chuck, the combination of a magnetizing coil, a core for the same, one end of which is provided with a plurality of pole projections the faces of which are arranged transversely of and at acute angles with the longest dimension of said core and a casing having one wall provided with openings for receiving the ends of said projections.

4. In a magnetic chuck, the combination of a magnetizing coil, a core for the same, one end of which is provided with a plurality of pole projections the faces of which are arranged transversely of and at acute angles with the longest dimension of said core, and a rectangular casing having one face provided with openings for receiving the ends of said projections, the longitudinal axis of the chuck making acute angles with said elongated projections.

5. A magnetic chuck having a rectangular holding face comprising a plurality of elongated areas of one polarity surrounded by an area of opposite polarity, the elongated areas being arranged parallel with each other and making acute angles with the edges of said holding face.

In testimony whereof I have signed this specification in the presence of two subscribing witnesses.

RALPH C. PATTON.

Witnesses:
G. W. STEERE,
E. L. SMITH.